United States Patent
Weinhold

(10) Patent No.: US 8,398,054 B2
(45) Date of Patent: Mar. 19, 2013

(54) DEVICE FOR THROTTLING THE FREE CROSS-SECTION OF A STEAM PIPE

(76) Inventor: Karl Weinhold, Neuss (DE)

( * ) Notice: Subject to any disclaimer, the term of this patent is extended or adjusted under 35 U.S.C. 154(b) by 332 days.

(21) Appl. No.: 12/676,234

(22) PCT Filed: Aug. 28, 2008

(86) PCT No.: PCT/EP2008/061268
§ 371 (c)(1),
(2), (4) Date: Jun. 23, 2010

(87) PCT Pub. No.: WO2009/030629
PCT Pub. Date: Mar. 12, 2009

(65) Prior Publication Data
US 2010/0282992 A1    Nov. 11, 2010

(30) Foreign Application Priority Data

Sep. 4, 2007  (DE) .................. 10 2007 041 753

(51) Int. Cl.
*F16F 5/10* (2010.06)
(52) U.S. Cl. ..................... 251/208; 251/205
(58) Field of Classification Search ............ 251/205, 251/206, 207, 208
See application file for complete search history.

(56) References Cited

U.S. PATENT DOCUMENTS

| 567,200 | A | * | 9/1896 | Senna | 251/304 |
| 2,889,852 | A | * | 6/1959 | Dunlap | 137/625.19 |
| 2,999,512 | A | * | 9/1961 | Barkow | 137/614.16 |
| 3,232,578 | A | | 2/1966 | Cousins | |
| 3,812,882 | A | * | 5/1974 | Taylor | 137/556.6 |
| 4,098,294 | A | * | 7/1978 | Woods | 137/614.11 |
| 4,549,579 | A | * | 10/1985 | Bergmann | 137/625.21 |
| 4,678,002 | A | * | 7/1987 | Valley | 137/315.14 |
| 5,025,832 | A | * | 6/1991 | Taylor | 137/625.31 |
| 5,088,689 | A | * | 2/1992 | Hendricks et al. | 251/304 |
| 5,370,358 | A | * | 12/1994 | Hunter et al. | 251/208 |
| 5,488,969 | A | * | 2/1996 | King et al. | 137/8 |
| 7,726,338 | B2 | * | 6/2010 | Clasen et al. | 137/625.31 |
| 7,779,861 | B2 | * | 8/2010 | Nicolini | 137/559 |
| 2003/0037741 | A1 | * | 2/2003 | Kohrs | 123/90.17 |

FOREIGN PATENT DOCUMENTS

| DE | 345092 | | 12/1921 |
| DE | 3421653 | A1 | 9/1985 |
| DE | 10236118 | A1 | 2/2004 |
| FR | 1335039 | | 12/1963 |
| GB | 296164 | | 8/1928 |
| NL | 1003615 | C2 | 1/1998 |

* cited by examiner

*Primary Examiner* — John K Fristoe, Jr.
*Assistant Examiner* — Matthew W Jellett
(74) *Attorney, Agent, or Firm* — The Webb Law Firm

(57) ABSTRACT

A device for manually regulating the flow quantity of steam pipes, with a throttle housing having an inlet and an outlet. In order to create a particularly compact device with simple construction and low maintenance, which furthermore has a modular structure, the device has a piston arranged eccentrically inside the throttle housing and rotatable about its longitudinal axis, which piston can be activated by at least one carrier element from outside the throttle housing and is provided with an eccentric longitudinal bore, and wherein the pipe cross-section, after rotation through a specified angle, is reduced to a desired cross-section.

11 Claims, 4 Drawing Sheets

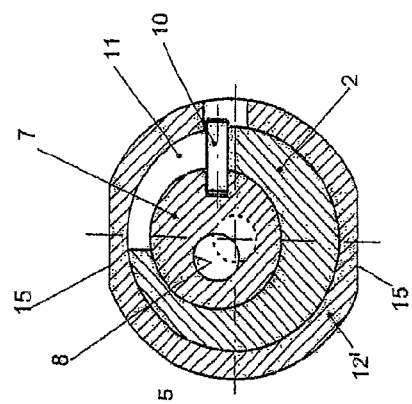
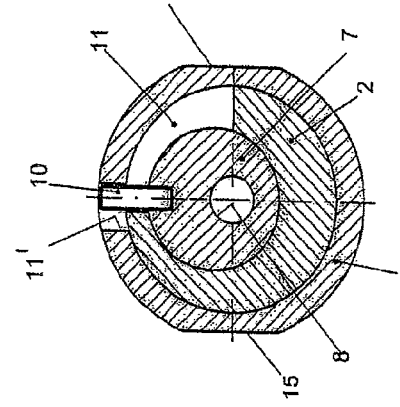
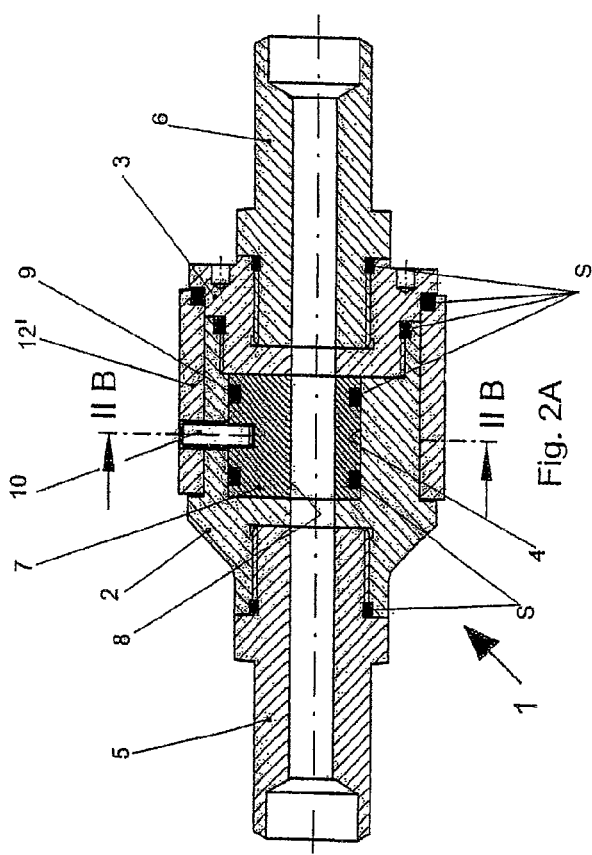

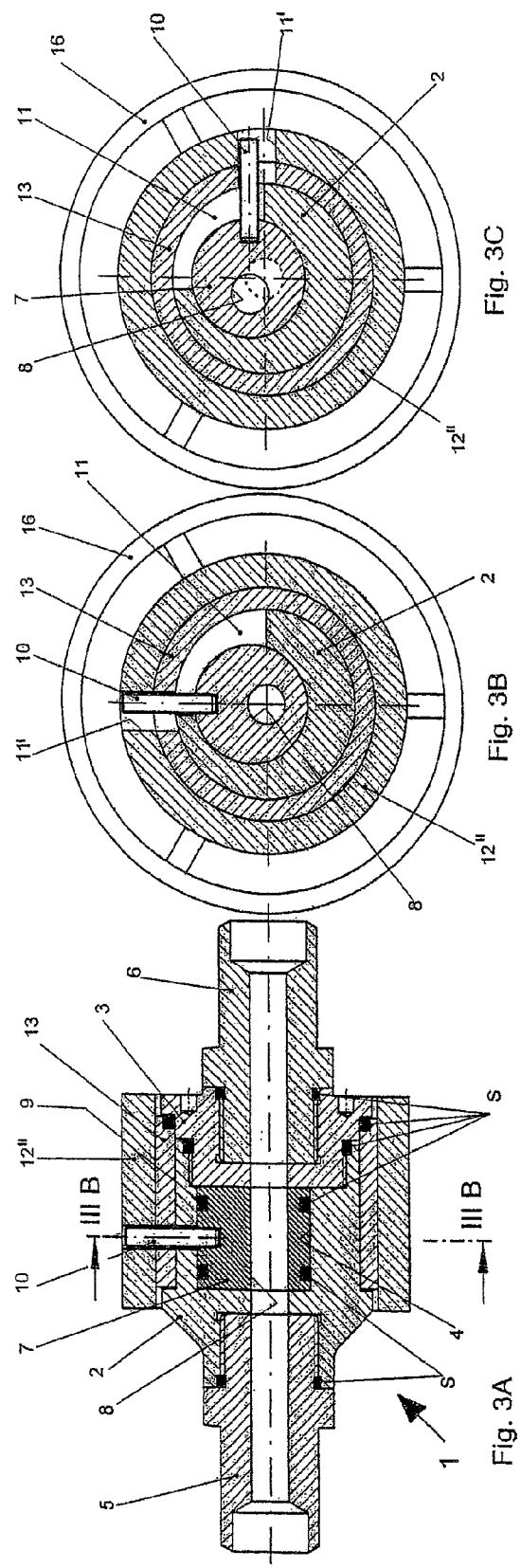

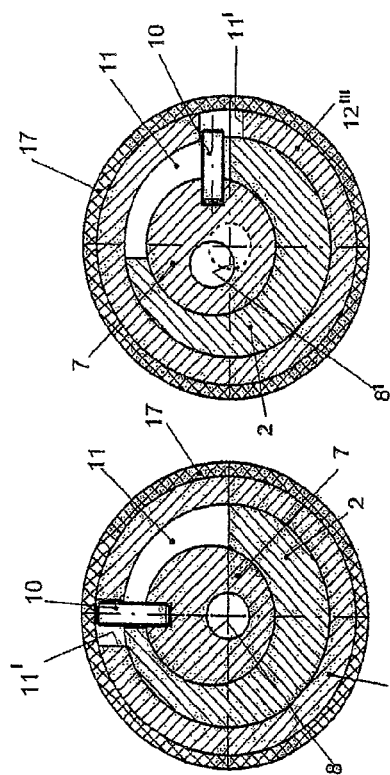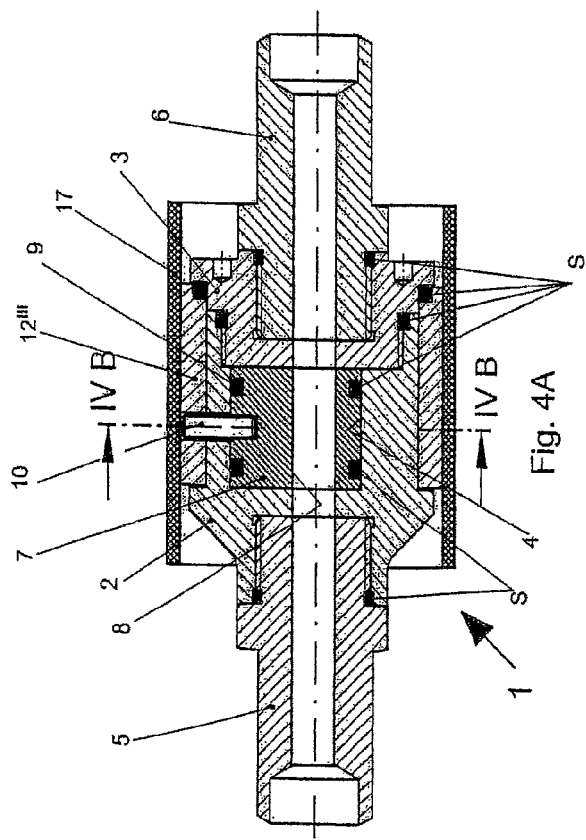

DEVICE FOR THROTTLING THE FREE CROSS-SECTION OF A STEAM PIPE

BACKGROUND OF THE INVENTION

1. Field of the Invention

The invention relates to a device for manually regulating the flow quantity of steam pipes, with a throttle housing having an inlet and an outlet.

2. Description of Related Art

Throttle housings of this type have been known for a long time in various designs. Generic throttle valves are used for example in pipeline, plant and boiler construction. DE 102 36 118 A1 discloses a throttle valve in which a piston, axially movable in a throttle housing, can protrude into the free cross-section of the pipeline in order to reduce it to the desired size. Whereas the known throttle valve is indeed constructed relatively small in the pipeline direction, the construction size perpendicular to the pipeline in the area of the throttle housing is extremely large.

The object forming the basis of the invention is therefore to design and refine a device of the type cited initially and described above in more detail such that with a simple construction and low maintenance, a particularly compact device is obtained. In addition the device should have a modular structure.

SUMMARY OF THE INVENTION

According to the invention, the above object is achieved by a device with a piston arranged eccentrically inside the throttle housing and rotatable about its longitudinal axis, which piston can be activated by at least one carrier element from outside the throttle housing and is provided with an eccentric longitudinal bore, and wherein the pipe cross-section, after rotation through a specified angle, is reduced to a desired cross-section.

The device according to the invention, referred to below as a throttle valve for short, is preferably used on steam pipes to regulate the flow quantity. This avoids a throttle state being achieved with existing shut-off taps or steam nozzles, which throttle state in these valves would lead to a temperature rise that would destroy the sealing rings in the shut-off element. In particular, the throttle valve according to the invention should always retain a minimum flow quantity. The throttle valve should therefore not be used as a shut-off element but is intended solely for use as a throttle element. It is particularly suitable as a creeping steam throttle.

According to a further teaching of the invention, as a carrier element at least one pin is provided that is attached to the piston and points radially outward and is swivelable in a recess in the throttle housing. In this way, by rotating the piston by means of the pin, the cross-section change and hence the flow quantity can be regulated with great precision.

A further embodiment of the invention provides that to activate the pin, an outer sleeve is provided, with a recess to hold the pin, wherein the sleeve is arranged rotatable about the throttle housing. This embodiment is particularly advantageous as the pin "disappears" within the recess in the sleeve i.e. does not protrude outwards and therefore, for example when installed in steam hoses, cannot be damaged or even destroyed on its movement.

The invention proposes a plurality of alternatives for design of the sleeve, firstly the sleeve can be provided with radial bores to receive a hook wrench. Alternatively it is also possible to form the sleeve with at least two diametrically opposed planar surfaces to receive an open-ended wrench.

Both alternatives depicted are particularly compact, but for adjustment usually require a tool (hook wrench or open-ended wrench), as the sleeve on the throttle housing must be stabilised against autonomous rotation so that it does not change its position by itself. Thus at the same time, the sleeve fulfils the function of a friction ring.

A further alternative to the throttle valve according to the invention provides that the sleeve is provided with an additional hand wheel. This design is therefore particularly suitable for stationary installation.

As a further possible embodiment, the sleeve is provided with an insulation body. Such a design is particularly suitable as it is firstly compact and secondly constitutes protection against burning for the operator.

In a further embodiment of the invention it is provided that the throttle housing is designed as two parts and has a main element and a retaining element. The main element has an eccentric bore to hold the piston which can then be axially fixed in the main element by means of the retaining element.

To ensure that no medium can reach the outside via the recess in the throttle housing, the piston has peripheral grooves arranged on the end to hold sealing rings.

Depending on the design of the device according to the invention, an additional friction ring can be arranged between throttle housing and sleeve to retain the position of the piston once set and hence the selected flow quantity.

Depending on the geometric distribution of the eccentric arrangement of the piston and/or the eccentric arrangement of the longitudinal bore in the piston, a quarter turn is sufficient to bring the cross-section surface in a controlled manner from the "open" position into the "fully throttled" position. For this, the recess in the throttle housing runs over approximately one quarter of its periphery.

Inlet and outlet of the throttle housing can be formed as weld-on socket pieces or be provided with an internal and/or external thread, depending on the application for which the respective throttle system is intended.

BRIEF DESCRIPTION OF THE DRAWINGS

FIGS. 2A-2C are cross-sectional views of a second exemplary embodiment of the device according to the invention;

FIGS. 3A-3C are cross-sectional views of a third exemplary embodiment of the device according to the invention; and FIGS. 4A-4C are cross-sectional views of a further exemplary embodiment of the device according to the invention.

DETAILED DESCRIPTION OF THE PREFERRED EMBODIMENTS

Figure 1C:
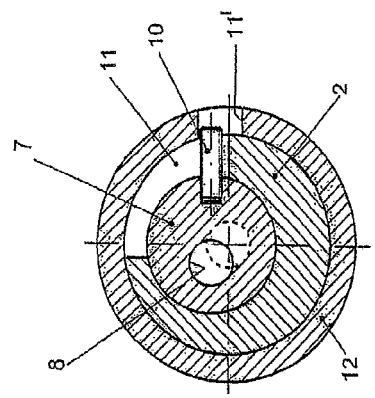
FIGS. 1A-1C are cross-sectional views of a first exemplary embodiment of the device according to the invention.

All four exemplary embodiments depicted have the same basic construction. They consist firstly and essentially of a throttle housing 1 which in each case consists of a main element 2 and a retaining element 3. The main element 2 contains an eccentrically arranged bore 4 and the throttle housing furthermore is provided with an inlet 5 and an outlet 6, as shown in FIGS. 1A, 2A, 3A and 4A. The eccentrically arranged bore 4 in the main element 2 of each throttle housing 1 serves to hold a piston 7 which in turn is provided with an eccentrically arranged bore 8. Axially the (rotary) piston 7 inside the throttle housing 1 is fixed in the main element 2 by the retaining element 3. For this the main element 2 and the retaining element 3 have corresponding threads (not shown in further detail) so that the retaining element can be screwed into the main element 2 in the manner of a plug. Here too, as at the further butt joints, sealing rings S ensure the necessary seal. Diametrically opposed bores in the retaining element 3 which are not shown in detail allow installation with a suitable tool.

In the exemplary embodiments shown and hence preferred, a pin 10 is introduced in each piston 7 and the main element 2 has a recess 11 which allows rotation of the pin 10 through an angle of around 90°. Due to the eccentric position of the piston 7 and the also eccentric arrangement of the bore 8, the flow cross-section is reduced the further the bore 8 is swiveled out of the flow axis. In FIGS. 1B, 2B, 3B and 4B, the throttle valve is shown in its open position and in FIGS. 1C, 2C, 3C and 4C the throttle valve is shown in the end position i.e. the position with the minimum cross-section.

It is clear that by changing the geometry (arrangement and position of cams, size of piston 7 or bore 8 etc.) various throttle possibilities arise. In the exemplary embodiment shown and hence preferred, throttling is relatively linear. A corresponding change in geometry, however, results in a throttle valve in which, at the start of throttle movement, there is a relatively great contraction of the cross-section, wherein still a relatively large travel is possible for (fine) regulation of a small cross-section. Such a design is suitable in particular as a creeping steam model.

Figure 1B:
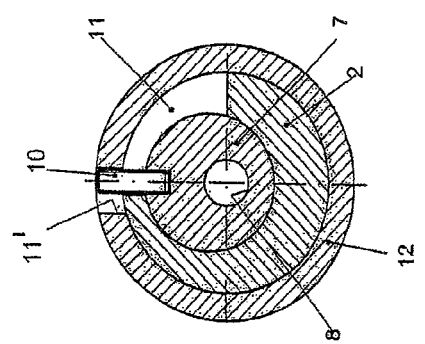
Figure 1A:
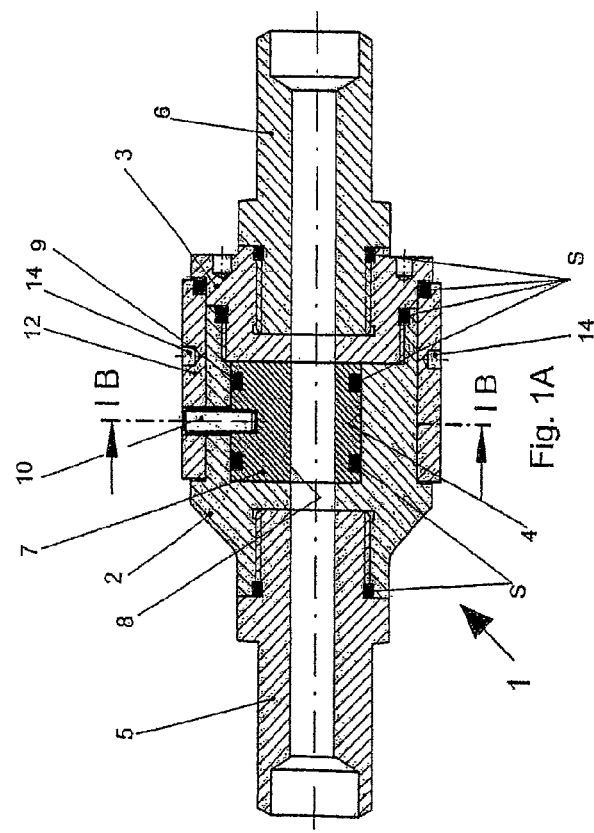

FIGS. 1A to C now show an embodiment of the device according to the invention in which the sleeve 12 is provided with bores 14 in order to be adjusted by means of a hook wrench (not shown).

The embodiment in FIGS. 2A to 2C is very similar. Here two diametrically opposed sections of the sleeve 12' are made flattened so that operation is possible by means of an (open-ended) wrench on the resulting flat surfaces 15.

In the embodiment according to FIGS. 3A to 3C, the outer sleeve 12" has an additional hand wheel 16 which for greater clarity is shown only in the two cross-section views in FIGS. 3B and 3C. Here an additional friction ring 13 between throttle housing 1 and sleeve 12" ensures that the throttle position, once selected, of the device according to the invention cannot be changed by itself.

FIGS. 4A to 4C finally show a particularly compact design of the throttle valve according to the invention in which the sleeve 12''' (as in the embodiments in figure groups 1 and 2) acts as a friction ring and on its outside is also designed with an insulation body 17 as heat protection. In the exemplary embodiment shown and hence preferred, the insulation body 17 also covers the recess 11' of the sleeve 12''' so that the penetration of dirt or other foreign bodies is reliably excluded. This design is also regarded as extremely user-friendly since, due to the insulation body, burns from direct contact with the steam-heated throttle housing 1 are excluded.

Evidently, within the limits of the invention, further possible embodiments of the throttle valve according to the invention are conceivable which are not covered by the exemplary embodiments described above as examples only.

The invention claimed is:

1. A device for manually regulating the flow quantity of steam pipes, comprising
   a throttle housing having an inlet and an outlet, the throttle housing having a main element and a retaining element; and
   a piston arranged eccentrically inside the throttle housing and is rotatable about its longitudinal axis,
   wherein the piston is arranged in an eccentrically arranged bore of the main element of the throttle housing and the retaining element axially fixes the piston in the main element the main element and the retaining element in use, are in a fixed non-rotatable position,
   wherein the piston can be activated by at least one carrier element from outside the throttle housing and is provided with an eccentric longitudinal bore, and
   wherein the pipe cross-section, after rotation through a specified angle, is reduced to a desired cross-section such that a minimum flow quantity is retained in all piston positions.

2. The device according to claim 1, wherein as a carrier element at least one pin is provided that is attached to the piston and points radially outward and is swivelable in a recess in the throttle housing.

3. The device according to claim 2, wherein to activate the pin, an outer sleeve is provided, with a recess to hold the pin and the sleeve is arranged rotatable about the throttle housing.

4. The device according to claim 3, wherein the sleeve has at least two diametrically opposed planar surfaces.

5. The device according to claim 3, wherein the sleeve is provided with an additional hand wheel.

6. The device according to claim 3, wherein the sleeve is provided with an insulation body.

7. The device according to claim 1, wherein the piston has peripheral grooves arranged on its ends to hold sealing rings.

8. The device according to claim 3, wherein a friction ring surrounds at least a portion of the throttle housing and the sleeve surrounds the friction ring such that the friction ring is arranged between the throttle housing and the sleeve.

9. The device according to claim 2, wherein the recess runs over approximately one quarter of the periphery of the throttle housing.

10. The device according to claim 1, wherein the inlet and the outlet of the throttle housing are formed as socket pieces that are required to be welded to another component to establish a connection therebetween.

11. The device according to claim 1, wherein the inlet and the outlet of the throttle housing are provided with internal threads, external threads, or a combination thereof.

* * * * *

UNITED STATES PATENT AND TRADEMARK OFFICE
CERTIFICATE OF CORRECTION

PATENT NO.        : 8,398,054 B2                                              Page 1 of 1
APPLICATION NO.   : 12/676234
DATED             : March 19, 2013
INVENTOR(S)       : Karl Weinhold It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

First Day of September, 2015

Michelle K. Lee
*Director of the United States Patent and Trademark Office*